United States Patent Office 3,411,886
Patented Nov. 19, 1968

3,411,886
PRODUCTION OF THIONYL HALIDE AND
AROMATIC ACYL HALIDES
Emmett H. Burk, Jr., Glenwood, and Byron W. Turnquest, Chicago, Ill., assignors to Sinclair Research Inc., New York, N.Y., a corporation of Delaware
No Drawing. Filed Aug. 16, 1965, Ser. No. 480,175
11 Claims. (Cl. 23—203)

ABSTRACT OF THE DISCLOSURE

A method for the production of thionyl halide and aromatic acyl halides, the halogen atoms of the halides having an atomic number from 17 to 35. The method involves reacting, in the liquid phase, sulfur dioxide with an aromatic compound having at least one trihalomethyl radical attached to the aromatic nucleus. The halogen of the trihalomethyl radical has an atomic number from 17 to 35. The reaction is conducted in the presence of a catalytic amount of ferric halide and the halogen atoms of the ferric halide have an atomic number from 17 to 35.

---

This invention relates to a method for the manufacture of thionyl halide and an aromatic acyl halide. More particularly, the invention is concerned with the reaction of sulfur dioxide and a trihalomethyl-substituted aromatic compound in the presence of a ferric chloride or bromide catalyst. The products from the reaction are thionyl chloride or bromide and an aromatic acyl halide corresponding to the trihalomethyl-substituted aromatic compound, that is, at least one trihalomethyl group is converted to an acyl halide radical.

Thionyl halides such as thionyl chloride and thionyl bromide are highly desirable chemicals and are used in a variety of synthesis reactions. Aromatic acyl halides are similarly useful compounds which can be employed in many ways, for instance they can be hydrolyzed to the corresponding carboxylic acids. By the present invention, we have devised a reaction system which produces both the desired thionyl halide and aromatic acyl halide.

In our method, sulfur dioxide is reacted with the trihalomethyl-substituted aromatic compound while the latter is in the liquid phase and a ferric chloride or ferric bromide catalyst is employed. Thus, the catalyst of the invention is a ferric halide catalyst wherein the halogen atoms of said ferric halide have an atomic number of 17 to 35. The preferred catalyst is ferric chloride. When hexachloro paraxylene is used the reaction can be illustrated by the following equation:

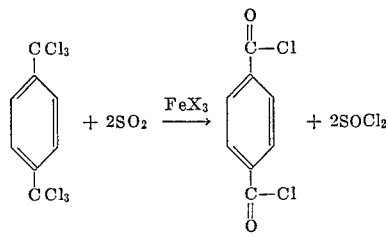

The reaction can be conducted at a temperature convenient to the aromatic being in the liquid phase, for instance ambient temperatures are useful. We have found no particular need for employing temperatures exceeding about 120° C. and preferably, the reaction temperature is about 15–75° C. The ferric halide catalyst of the invention is present in a small, catalytically-effective amount, for instance about 0.1 to 5%, preferably about 0.5 to 2% based on the weight of the trihalomethyl aromatic reactant. Excessive amounts of catalyst may be undesirable as they tend to complex the reaction product and complicate its recovery. The action of the ferric chloride or ferric bromide as a catalyst for the reaction seems unique since halides of zinc, aluminum, titanium and cadmium and manganese have not been found to be effective catalyst in our system.

Various trihalomethyl-substituted aromatic hydrocarbons can be employed as a reactant in our process and in these compounds the trihalomethyl groups which are converted to the corresponding acyl halide radicals are attached to an aromatic ring. The halogen atoms of the trihalomethyl groups are either chlorine or bromine, i.e. have an atomic number from 17 to 35. The aromatic hydrocarbons may contain one or more aromatic rings in fused or non-fused relationship, for instance as represented by the benzene, naphthalene and diphenylene structures. The aromatic compound has at least one trihalomethyl group attached to one or more of the aromatic rings and the compound may contain two or more such trihalomethyl groups on one or more aromatic rings. The number of trihalomethyl radicals often does not exceed 4, and preferably there are 2 such groups attached to a given aromatic ring. When more than one trihalomethyl group is on a given ring, they will not be positioned ortho to one another. The aromatic rings of the trihalomethyl aromatic compound may have non-interfering substituents. Often the aromatic compound may have 1 to 3 rings and 7 to about 30 carbon atoms, preferably 7 to about 18 carbon atoms.

The trihalomethyl aromatic hydrocarbon reactant can be made by halogenation of the corresponding methyl-substituted aromatic compound. Illustrative of the methyl-substituted compounds are paraxylene, metaxylene, mesitylene, toluene, methyl naphthalene, etc. Suitable trihalomethyl-substituted aromatic compounds include, for instance, hexachloro-para and meta xylene, 1,3,5-tris (trichloromethyl)benzene, tribromomethyl benzene, trichloromethyl naphthalene, etc.

As previously mentioned, our reaction is conducted with the trihalomethyl aromatic compound in the liquid phase. It is often convenient to provide the liquid phase by the use of a solvent. Sulfur dioxide is a suitable solvent and by supplying an excess to the reaction the sulfur dioxide serves both as a reactant and as a solvent for the trihalomethyl aromatic compound. Other suitable solvents may be employed such as the lower alkyl halides, e.g. methylene chloride.

The present invention is illustrated by the following specific examples which are not to be considered limiting.

EXAMPLE I 3.1 grams of ferric chloride, 1 gram of hexachloro-p-xylene and 8.3 grams of sulfur dioxide were added to a glass tube maintained in a water bath at room temperature. The glass tube was sealed and the hexachloro-p-xylene went into solution to produce terephthaloyl chloride and thionyl chloride.

EXAMPLE II

A glass polymerization bottle was placed in a cooling bath and the air was flushed out with dry nitrogen. A slow stream of nitrogen was continually passed through the bottle to keep moisture from condensing on the cold sides of the bottle as the reactants were added. Hexachloro-p-xylene, 60.4 grams (0.193 mole) and anhydrous FeCl₃, 3.01 grams (0.019 mole) were placed in the cooled bottle and SO₂, 133 grams (2.08 moles) was condensed into the bottle, for instance at about −40° C. The bottle was closed securely and allowed to warm to room temperature. After approximately 30 minutes at room temperature the hexachloro-p-xylene had dissolved giving a dark, reddish-brown solution. The solution was allowed to stand 48 hours to insure completion of the reaction.

The bottle was cooled to about −40° C. to allow opening and attached to a cold trap. The $SO_2$ was allowed to distill into the cold trap. After removal of the $SO_2$ at room temperature, vacuum was applied to remove any remaining $SO_2$ and any low boiling material present. The contents of the cold trap were transferred to a low temperature still and the $SO_2$ was removed overhead leaving 43 grams of a low boiling liquid which was identified to be thionyl chloride of 90% purity. The other component was $SO_2$. The amount of thionyl chloride was 84.5% of theory yield.

The dark solid remaining in the bottle was dissolved in methylene chloride and the $FeCl_3$ which separated was removed by filtration. The methylene chloride solution was then washed with water to remove the last traces of iron. An immediate precipitate was formed which was removed by filtration and dried. This precipitate proved to be crude terephthalic acid and the weight was 3.6 grams. The methylene chloride solution was further washed with water with no further precipitation occurring. The methylene chloride solution was dried and the methylene chloride removed by distillation leaving 34 grams of terephthaloyl chloride, 0.168 mole, 87% of theory, M.P. 78–79° C.

In another run employing this reaction set-up, 3.1 grams of ferric chloride, 97.8 grams of hexachloro-paraxylene and 81.6 of sulfur dioxide when held in the bottle at room temperature for 21 hours gave 69 grams of 89% thionyl chloride (83.5% of theory), 59 grams of terephthaloyl chloride, melting point 72–75° C. (93% of theory) and a very small amount of terephthalic acid.

In another reaction employing this system, 0.5 gram of ferric chloride, 48.9 grams of hexachloro-paraxylene, 125.6 grams of sulfur dioxide when maintained in the bottle at room temperature for 21 hours gave 28 grams of terephthaloyl chloride (89.5% of theory), 31.3 grams of 90% thionyl chloride (80% of theory) and, due to the use of ether instead of water in the product recovery, the acyl chloride was apparently contaminated with a small amount of diethyl terephthalate.

We claim:

1. A method for the production of thionyl halide and aromatic acyl halide, the halogen atoms of said halides having an atomic number from 17 to 35 which consists essentially of reacting sulfur dioxide with trihalomethyl aromatic hydrocarbon in liquid phase, said halo having an atomic number from 17 to 35, said reaction being conducted in the presence of a catalytic amount of ferric halide, the halogen atoms of said ferric halide having an atomic number from 17 to 35, to produce said thionyl halide and corresponding aromatic acyl halide.

2. The method of claim 1 wherein the catalyst is ferric chloride.

3. The method of claim 2 in which the reaction temperature is about 15–75° C.

4. The method of claim 3 in which the reaction is conducted in the presence of an excess of sulfur dioxide sufficient to dissolve said trihalomethyl aromatic.

5. The method of claim 4 in which the trihalomethyl aromatic is hexachloro-paraxylene.

6. The method of claim 5 in which the amount of ferric chloride is about 0.5–2 weight percent based on the hexachloro-paraxylene.

7. The method of claim 1 in which the trihalomethyl aromatic is hexachloro-paraxylene.

8. The method of claim 1 wherein the aromatic hydrocarbon compound is selected from the group consisting of benzene and naphthalene, each having attached to the aromatic nucleus at least one trihalomethyl radical, said halo having an atomic number of 17 to 35.

9. The method of claim 1 in which the reaction temperature is up to about 120° C.

10. The method of claim 8 in which the reaction temperature is up to about 120° C.

11. A method for the production of thionyl chloride and terephthaloyl chloride which consists essentially of reacting sulfur dioxide with hexachloro-p-xylene in liquid phase, said reaction being conducted in the presence of a catalytic amount of ferric chloride, at a temperature within the range of about 15° C. to about 120° C. thereby producing thionyl chloride and terephthaloyl chloride.

References Cited

UNITED STATES PATENTS

| | | | |
|---|---|---|---|
| 2,393,247 | 1/1946 | Hallowell et al. | 23—203 |
| 2,856,425 | 10/1958 | Schreyer | 260—544 |
| 3,234,274 | 2/1966 | Renckhoff et al. | 260—544 |

LORRAINE A. WEINBERGER, *Primary Examiner.*

J. H. NIELSEN, *Assistant Examiner.*